United States Patent
Hasegawa et al.

(10) Patent No.: US 10,290,866 B2
(45) Date of Patent: May 14, 2019

(54) STABILIZED LITHIUM POWDER

(71) Applicant: TDK CORPORATION, Tokyo (JP)

(72) Inventors: Tomohiko Hasegawa, Tokyo (JP); Masahiro Tsuchiya, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 647 days.

(21) Appl. No.: 14/874,983

(22) Filed: Oct. 5, 2015

(65) Prior Publication Data

US 2016/0099467 A1 Apr. 7, 2016

(30) Foreign Application Priority Data

Oct. 3, 2014 (JP) ................................ 2014-204698
Aug. 27, 2015 (JP) ................................ 2015-167347

(51) Int. Cl.
| | |
|---|---|
| H01M 4/38 | (2006.01) |
| H01M 10/0525 | (2010.01) |
| H01M 4/1391 | (2010.01) |
| H01M 4/36 | (2006.01) |
| H01M 4/62 | (2006.01) |

(52) U.S. Cl.
CPC ......... *H01M 4/382* (2013.01); *H01M 4/1391* (2013.01); *H01M 4/366* (2013.01); *H01M 4/62* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2007/0006680 A1* | 1/2007 | Dover ................... | B22F 1/0085 |
| | | | 75/331 |
| 2008/0070120 A1 | 3/2008 | Miyawaki et al. | |
| 2017/0047580 A1* | 2/2017 | Cho ....................... | H01M 4/134 |

FOREIGN PATENT DOCUMENTS

| | | | | |
|---|---|---|---|---|
| CN | 102642024 A | * | 8/2012 | ............... B22F 1/02 |
| JP | 2699026 B2 | | 1/1998 | |
| JP | 2010-160986 A | | 7/2010 | |
| JP | 5196118 B2 | | 5/2013 | |
| WO | 94/19100 A1 | | 9/1994 | |
| WO | 02/21632 A1 | | 3/2002 | |

* cited by examiner

*Primary Examiner* — Ula C Ruddock
*Assistant Examiner* — Tony S Chuo
(74) *Attorney, Agent, or Firm* — Oliff PLC

(57) ABSTRACT

Stabilized lithium powder according to an embodiment of this disclosure includes powder particles satisfying a relation of $C \leq 0.90$, where C represents average circularity of the powder particles. And a lithium secondary battery according to an embodiment of this disclosure comprises a negative electrode doped with lithium from the stabilized lithium powder for a lithium ion second battery according to an embodiment of this disclosure, a positive electrode, and an electrolyte.

11 Claims, 2 Drawing Sheets

STABILIZED LITHIUM POWDER

CROSS-REFERENCE TO RELATED APPLICATION

This application claims priority from Japanese Patent Application No. 2014-204698 filed with the Japan Patent Office on Oct. 3, 2014, the entire content of which is hereby incorporated by reference.

BACKGROUND

1. Technical Field

The present disclosure relates to stabilized lithium powder.

2. Related Art

Lithium ion secondary batteries have smaller weight and higher capacity than nickel-cadmium batteries or nickel-hydrogen batteries. For this reason, lithium ion secondary batteries have been widely used as a power source for portable electronic appliances. Moreover, a lithium ion secondary battery is the major candidate for a power source to be mounted on hybrid vehicles and electric vehicles. Along with the size reduction and higher functionality of the recent portable electronic appliances, the lithium ion secondary battery for the power source of such appliances has been demanded to have further higher capacity.

The capacity of the lithium ion secondary battery mainly depends on an electrode active material. As a negative electrode active material, graphite is typically used. To meet the above demand, however, it is necessary to use a negative electrode active material with higher capacity. In view of this, metal silicon (Si) with much higher theoretical capacity (4210 mAh/g) than that of graphite (372 mAh/g) has attracted attention.

On the other hand, the use of silicon oxide ($SiO_x$) with the cycle characteristic superior to that of metal silicon has also been examined. Silicon oxide, however, has higher irreversible capacity than metal silicon. The amount of lithium that contributes to the charging and discharging is determined uniquely by the amount of lithium in the positive electrode. Therefore, the increase in irreversible capacity in the negative electrode leads to the lower capacity of the whole battery.

According to a proposed technique, for reducing the irreversible capacity, metal lithium is brought into contact with a negative electrode in advance before the charging/discharging is started, thereby doping the negative electrode with lithium (lithium pre-doping) (for example, see Japanese Patent No. 5196118, JP-A-2010-160986, and Japanese Patent No. 2699026). In particular, Japanese Patent No. 5196118 discloses a method of doping a negative electrode with lithium by forming a lithium-containing film on the negative electrode. Further, JP-A-2010-160986 discloses a method of doping a negative electrode with lithium by having lithium particles contained in a negative electrode active material layer.

As a lithium material used for the doping, a material with higher safety has been desired because the lithium has high reactivity. In view of this, stabilized lithium powder for a lithium ion secondary battery with high safety that can be easily handled has been suggested. This lithium powder includes lithium particles with a surface covered with a film that is stable in the air (see Japanese Patent No. 2699026).

A method for fabricating a negative electrode used for a lithium ion secondary battery typically includes a step of, after forming a layer including a negative electrode active material on a current collector, pressing the negative electrode active material layer so that the negative electrode active material layer is brought into close contact with the current collector. Through this pressing step, lithium metal of stabilized lithium powder particles for a lithium ion secondary battery is exposed, and accordingly the doping of the negative electrode progresses. Therefore, as desired characteristic features of the stabilized lithium powder for a lithium ion secondary battery, not only the higher stability of lithium but also the doping characteristics for achieving the excellent battery characteristics have been desired.

SUMMARY

Stabilized lithium powder for a lithium ion secondary battery according to an embodiment of this disclosure includes powder particles satisfying a relation of $C \leq 0.90$, where C represents average circularity of the powder particles.

DETAILED DESCRIPTION

Figure 1:
FIG. 1 is an optical microscope photograph of a stabilized lithium powder particle for a lithium ion secondary battery according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When stabilized lithium powder for a lithium ion secondary battery including spherical lithium particles (hereinafter referred to as "stabilized lithium powder" as appropriate) as disclosed above in the patent documents is used, a high pressing force is required in the pressing step of doping work in order to break a covering layer to expose the lithium particles. The pressing with the large force produces a defect such as a crack in the negative electrode. This results in the lower initial charging/discharging efficiency in the battery.

On the other hand, if the pressing force is reduced in order to suppress the damage on the negative electrode, the stabilized lithium powder particles are not sufficiently crushed. This interrupts the efficient doping, which leads to the problem that the irreversible capacity is not lowered.

Stabilized lithium powder according to an embodiment of the present disclosure has been achieved in view of the problem in the above-described related art. An object of the present disclosure is to provide stabilized lithium powder with excellent doping efficiency and with less damage on a negative electrode in a doping step, and to provide a lithium ion secondary battery using the stabilized lithium powder.

To achieve the above object, the stabilized lithium powder according to the embodiment of the present disclosure includes lithium particles satisfying the relation of $C \leq 0.90$, where C represents the average circularity (hereinafter simply referred to as circularity) of the lithium particles. Here, the circularity C is defined by $C=4\pi S/L^2$ where S represents the area of the particle and L represents the circumference length.

In the configuration as above, the stress applied to the stabilized lithium powder in the pressing step easily concentrates on a part thereof. Therefore, a small pressing force is enough to crush the lithium powder. This enables the sufficient reduction of the irreversible capacity in the doping work. As a result, the initial charging/discharging efficiency of the lithium ion secondary battery is improved largely.

The stabilized lithium powder according to the embodiment of the present disclosure may further include lithium particles satisfying the relation of FD≤3.0 μm, where FD represents the average Feret diameter of the lithium particles. The Feret diameter is defined by the length of the long side of the rectangle circumscribing the observation image of the particle obtained with a microscope or the like.

The lithium particles with the smaller Feret diameter are crushed by the smaller pressing force. This can reduce the irreversible capacity.

The stabilized lithium powder for a lithium ion secondary battery according to the embodiment of the present disclosure may further include transition metal by $1.0 \times 10^{-3}$ mass % or more and $1.0 \times 10^{-1}$ mass % or less.

In this case, the stabilized film becomes hard and fragile because the transition metal is contained by a predetermined ratio. This makes the stabilized lithium powder particles more easily crushable. Thus, the irreversible capacity can be further reduced.

According to the present disclosure, the stabilized lithium powder with excellent doping efficiency can be provided. Moreover, by the use of the stabilized lithium powder according to the present disclosure, the lithium ion secondary battery with largely improved initial charging/discharging efficiency can be provided.

An embodiment of the present disclosure will be hereinafter described. The embodiment of the present disclosure is not limited to the embodiment below.

<Stabilized Lithium Powder>

The average circularity C representing the particle state of the stabilized lithium powder according to this embodiment is 0.90 or less. The stabilized lithium powder includes metal lithium covered with one or a plurality of stable lithium compounds.

Examples of the stable lithium compound include a carbonate, a hydroxide, an oxide, and a sulfide. Specifically, LiOH, $Li_2CO_3$, $Li_2O$, and $Li_2S$ can be used. These compounds can be identified by X-ray diffraction and Raman spectrometry. Above all, the lithium compound may mainly contain $Li_2O$ for higher safety.

The average circularity C of the stabilized lithium powder particles may be 0.80 or less. The particle with smaller circularity can be crushed more easily. Thus, the damage on the negative electrode by the pressing is suppressed further. As a result, the excellent doping effect can be obtained.

The average Feret diameter of the stabilized lithium powder particles may be 53.0 μm or less, particularly 25.0 μm or less, from the viewpoint of the uniform dispersion on the electrode surface after the application.

From the viewpoint of the fragility of the stabilized film, the stabilized lithium powder may contain the transition metal by $1.0 \times 10^{-3}$ mass % or more and $1.0 \times 10^{-1}$ mass % or less, particularly $1.0 \times 10^{-3}$ mass % or more and $10.0 \times 10^{-3}$ mass % or less, relative to the stabilized lithium powder. The stabilized lithium powder with the above configuration provides the further excellent doping effect. This is because the presence of foreign substance makes the stabilized film fragile.

The transition metal may be contained in the stabilized film. The above configuration of the stabilized lithium power makes the stabilized film fragile more efficiently. The quantification of the transition metal can be conducted by ICP (Inductively Coupled Plasma).

Further, the transition metal may be metal that can be easily oxidized. Examples of such transition metal include Mg, Al, Ti, Zr, Mn, Zn, Cr, Fe, Ni, Sn, and Cu. Above all, Fe can be particularly used.

From the viewpoint of the doping efficiency, the metal lithium may constitute 80 parts by mass or more of the stabilized lithium powder. This enables the easy contact between the metal lithium and the negative electrode active material in the pressing, and accordingly, the further excellent doping effect can be obtained.

(Method for Fabricating Stabilized Lithium Powder)

The stabilized lithium powder according to the embodiment is fabricated by a method below. First, a lithium ingot is input into hydrocarbon oil in a vessel, and then the hydrocarbon oil is heated to the melting point of lithium or higher. The melted lithium-hydrocarbon oil mixture obtained as above is stirred for a sufficient period of time, thereby preparing a dispersion solution. Then, the dispersion solution is cooled gradually by being stirred continuously. The sufficiently cooled dispersion solution is brought into contact with carbon dioxide ($CO_2$). Thus, a stabilized film is formed on a surface of a lithium particle. Finally, the lithium particle with the stabilized film is dried. In the case of adding transition metal, the metal is added when carbon dioxide is introduced.

The vessel may be a heat-resistant vessel. The stirring is conducted with the vessel tilted by 5 to 15 degrees. The number of rotations in the stirring may be set to 1000 rpm or more, particularly 3000 rpm to 10000 rpm.

When the lithium ingot is added by 1 part by mass, the hydrocarbon oil may be added by 1 to 30 parts by mass, particularly 2 to 15 parts by mass, from the viewpoint of the uniform dispersion after the melting.

The temperature at which the stabilized lithium powder according to the present disclosure is fabricated may be more than or equal to the temperature at which the lithium metal is melted. Specifically, the temperature is 190° C. to 250° C., particularly 195° C. to 240° C., and more particularly 200° C. to 230° C. When the temperature is too low, the lithium is solidified, which makes it difficult to fabricate the stabilized lithium powder. When the temperature is too high, the gasification occurs depending on the boiling point of the hydrocarbon oil, which makes the handling in fabrication difficult.

The temperature after cooling the dispersion solution may be 100° C. or less, particularly 50° C. or less. The dispersion solution can be cooled gradually over one hour or more.

When the lithium ingot is added by 1 part by mass, carbon dioxide can be added to the dispersion mixture by 0.1 to 10 parts by mass, particularly 1 to 3 parts by mass. Carbon dioxide may be introduced under the surface of this mixture. For fabricating the dispersion solution, the stirring may be conducted sufficiently to such a degree that the dispersed metal lithium is brought into contact with carbon dioxide introduced onto the melted lithium-hydrocarbon oil mixture.

<Negative Electrode>

With the use of the above stabilized lithium powder, the negative electrode is doped with lithium in the fabrication of the negative electrode. Then, the lithium ion secondary battery with the improved initial charging/discharging efficiency is obtained. As described below, a negative electrode active material layer 24 is formed on a negative electrode current collector 22, thereby forming a negative electrode 20.

(Negative Electrode Current Collector)

The negative electrode current collector 22 can be formed of a conductive plate material. Examples of the conductive plate material include a metal thin plate (metal foil) of copper, nickel, alloy thereof, and stainless steel.

(Negative Electrode Active Material Layer)

The negative electrode active material layer 24 mainly includes a negative electrode active material, a negative electrode binder, and a necessary amount of negative electrode conductive auxiliary agent.

(Negative Electrode Active Material)

As the negative electrode active material, a material with high irreversible capacity can be used. Examples of such a material include metal silicon (Si) and silicon oxide ($SiO_x$).

(Negative Electrode Binder)

The negative electrode binder binds the negative electrode active materials to each other, and binds the negative electrode active material and the negative electrode current collector 22 to each other. The binder may be any binder that enables the above binding. Examples of the binder include a fluorine resin such as polyvinylidene fluoride (PVDF) and polytetrafluoroethylene (PTFE). Other applicable examples of the binder include cellulose, styrene-butadiene rubber, ethylene-propylene rubber, polyimide resin, and polyamide-imide resin. Moreover, the electron-conductive polymer and the ion-conductive polymer can be used as the binder. Examples of the electron-conductive polymer include polyacetylene. In this case, the binder functions as a conductive auxiliary agent particle, so that the addition of a conductive auxiliary agent can be omitted. Examples of the applicable ion-conductive polymer include conductive polymers that conduct ions such as lithium ions. Specific examples thereof include a conductive polymer obtained by combining a monomer of a polymer compound (e.g., a polyether-based polymer compound such as polyethylene oxide and polypropylene oxide, and polyphosphazene) and a lithium salt such as $LiClO_4$, $LiBF_4$, or $LiPF_6$ or an alkali metal salt mainly containing lithium. Examples of a polymerization initiator used in the combining include a photopolymerization initiator and a thermal polymerization initiator, which are suited to the above monomer.

The amount of the binder contained in the negative electrode active material layer 24 is not particularly limited. The content ratio thereof may be 0.5 to 5 parts by mass relative to the mass of the negative electrode active material.

(Negative Electrode Conductive Auxiliary Agent)

The negative electrode conductive auxiliary agent is not particularly limited. Any known conductive auxiliary agent that provides the negative electrode active material layer 24 with excellent conductivity can be used. Examples of such a conductive auxiliary agent include a carbon-based material such as graphite and carbon black, metal micropowder of copper, nickel, stainless steel, iron, or the like, a mixture of the carbon material and the metal micropowder, and a conductive oxide such as ITO.

(Method for Fabricating Negative Electrode)

The dispersion solution obtained by dispersing the stabilized lithium powder into a solvent is applied onto the negative electrode active material layer formed on the negative electrode current collector. The current collector is dried and then pressed, thereby advancing the doping of the negative electrode active material with lithium. Thus, the negative electrode doped with lithium from the stabilized lithium powder is completed.

The solvent for the dispersion solution may be a solvent with a high steam pressure. Examples of such a solvent include normal heptane, normal hexane, and methylethylketone.

The method of pressing is not particularly limited, and may be a known method such as hand pressing or roller pressing.

<Lithium Ion Secondary Battery>

Figure 3:
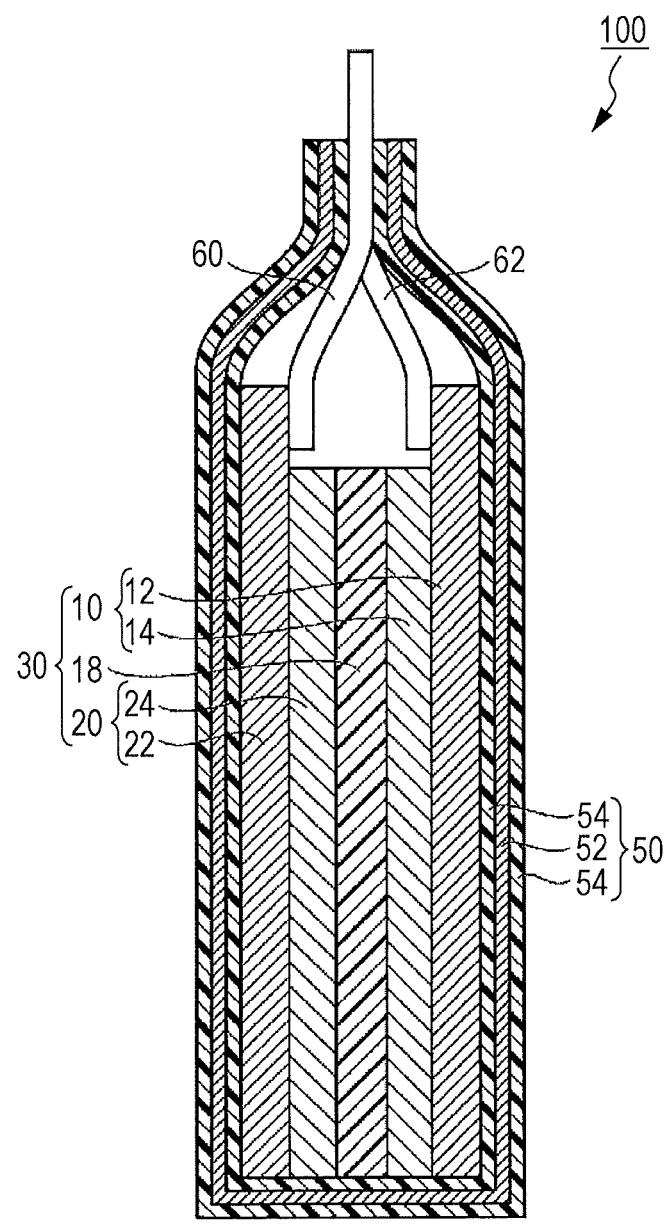
FIG. 3 is a schematic sectional view of the lithium ion secondary battery according to the embodiment.

FIG. 3 is a schematic sectional view of the lithium ion secondary battery according to the embodiment.

The negative electrode 20 doped with lithium, a positive electrode 10, and a separator 18 impregnated with the electrolyte are assembled as illustrated in FIG. 3, thereby fabricating a lithium ion secondary battery 100. The positive electrode 10 can be fabricated by forming a positive electrode active material layer 14 on a positive electrode current collector 12. The negative electrode 20 can be fabricated by forming the negative electrode active material layer 24 on the negative electrode current collector 22. In the drawing, a leading electrode for the positive electrode and a leading electrode for the negative electrode are denoted by 62 and 60, respectively.

<Positive Electrode>

(Positive Electrode Current Collector)

The positive electrode current collector 12 may be formed of any conductive plate material. Examples of the conductive plate material include aluminum, alloy thereof, and a metal thin plate (metal foil) of stainless steel.

(Positive Electrode Active Material Layer)

The positive electrode active material layer 14 mainly includes a positive electrode active material, a positive electrode binder, and a necessary amount of positive electrode conductive auxiliary agent.

(Positive Electrode Active Material)

The positive electrode active material is not particularly limited. Any electrode active material can be used that can reversibly advance the intercalation and deintercalation of lithium ions, or doping and de-doping between lithium ions and counter anions of the lithium ions (for example, $PF^{6-}$). Examples of such a positive electrode active material include lithium cobaltate ($LiCoO_2$), lithium nickelate ($LiNiO_2$), spinel lithium manganese ($LiMn_2O_4$), a composite metal oxide represented by general formula: $LiNi_xCo_yM-n_zMaO_2$ ($x+y+z+a=1$, $0 \le x \le 1$, $0 \le y \le 1$, $0 \le z \le 1$, $0 \le a \le 1$, M represents one or more elements selected from Al, Mg, Nb, Ti, Cu, Zn, and Cr), a lithium vanadium compound ($LiV_2O_5$), olivine $LiMPO_4$ (where M represents one or more elements selected from Co, Ni, Mn, Fe, Mg, Nb, Ti, Al, and Zr or represents VO), lithium titanate ($Li_4Ti_5O_{12}$), $LiNi_xCo_yAl_zO_2$ ($0.9 < x+y+z < 1.1$), and other composite metal oxides.

(Positive Electrode Binder)

The positive electrode binder is not particularly limited, and may employ the binder used as the negative electrode binder described above.

(Positive Electrode Conductive Auxiliary Agent)

The positive electrode conductive auxiliary agent is not particularly limited, and may employ the conductive auxiliary agent used as the negative electrode conductive auxiliary agent described above.

<Electrolyte>

The electrolyte is contained inside the positive electrode active material layer 14, the negative electrode active material layer 24, and the separator 18. The electrolyte is not particularly limited. Examples of the electrolyte used in this embodiment include an electrolyte solution containing a lithium salt.

As the electrolyte solution, an organic solvent that can function at high voltage may be used. Examples of such an electrolyte solution include an aprotic solvent with a high dielectric constant such as ethylene carbonate and propylene carbonate, dimethyl carbonate, ethylmethyl carbonate, and an aprotic solvent with low viscosity such as acetic esters and propionic esters. Moreover, any of these aprotic solvent with the high dielectric constant and any of the aprotic solvent with the low viscosity may be mixed at an appropriate ratio and this mixture may be used.

As the organic solvent, ionic liquid including imidazolium, ammonium, and pyridinium cations may be used. The counter anion is not particularly limited. Examples of the counter anion include $BF_4^-$, $PF_6^-$, and $(CF_3SO_2)_2N^-$. The ionic liquid and the organic solvent may be mixed and this mixture may be used.

The lithium salt is not particularly limited, and may employ the lithium salt used as the electrolyte of the lithium ion secondary battery. Examples of the lithium salt include a salt including an anion of an inorganic acid, such as $LiPF_6$, $LiBF_4$, $LiClO_4$, LiFSI, and LiBOB, and a salt including an anion of an organic acid, such as $LiCF_3SO_3$ and $(CF_3SO_2)_2$NLi.

The concentration of the lithium salt may be in the range of 0.5 to 2.0 M from the aspect of the electric conductivity. The conductivity of this electrolyte at a temperature of 25° C. may be 0.01 S/m or more. The conductivity is adjusted by the type and concentration of the lithium salt.

The electrolyte may be a solid electrolyte or a gel electrolyte. Such an electrolyte can contain a polymer material such as poly(vinylidene fluoride).

Moreover, any kind of additive may be added in the electrolyte solution of this embodiment. Examples of the additive include vinylene carbonate and methyl vinylene carbonate for the purpose of improving the cycle life, biphenyl and alkyl biphenyl for the purpose of preventing the overcharging, various carbonate compounds, various carboxylic anhydride, and various nitrogen-containing or sulfur-containing compounds for the purpose of deoxidation and dehydration.

The embodiment of the present disclosure has been described. However, the embodiment of the present disclosure is not limited to the above embodiment.

Stabilized lithium powder according to the present invention is not limited to uses for a lithium-ion secondary battery and can be applied to electrochemical devices such as a lithium-ion capacitor, EDLC (Electric Double Layer Capacitor), etc.

EXAMPLES

The present embodiment will be more specifically described with reference to Examples and Comparative Examples. The present embodiment is, however, not limited by the examples below.

Example 1

Fabrication of Stabilized Lithium Powder

Into a stainless steel resin vessel, 100 g of lithium ingot (KANTO CHEMICAL CO., INC.) and hydrocarbon oil (Carnation, a product of Witco) were added. The atmosphere in the vessel was replaced by dry argon. Next, this vessel was heated to 200° C. to melt the lithium ingot. The mixture including this melted lithium was stirred at a rotation speed of 8000 rpm for 10 minutes with the vessel tilted by 5 degrees. After that, the mixture was cooled down to room temperature for an hour while the mixture was stirred. After the cooling, while the stirring was continued, 5 g of carbon dioxide was supplied to the surface of the mixture in five minutes to fill the vessel. The stirring was stopped when the addition of carbon dioxide was fully finished. By washing the obtained powder with hexane, stabilized lithium powder was obtained. FIG. 1 is an optical microscope photograph of the stabilized lithium powder particle according to Example 1.

(Fabrication of Negative Electrode)

A slurry for forming the negative electrode active material layer was prepared by mixing 83 parts by mass of silicon oxide (SiO), 2 parts by mass of acetylene black, 15 parts by mass of polyamide-imide, and 100 parts by mass of N-methylpyrrolidone. This slurry was applied on one surface of a 14-μm-thick copper foil as a current collector so that the negative electrode active material is applied by 2.0 mg/cm$^2$. The slurry on the copper foil was dried at 100° C., thereby forming the negative electrode active material layer. After that, roll-pressing was conducted for the pressure molding. Then, heat treatment was conducted in vacuum at 350° C. for three hours, thereby forming the negative electrode having the negative electrode active material layer with a thickness of 22 μm.

A dispersion solution was prepared by dispersing 100 parts by mass of the stabilized lithium powder into 100 parts by mass of methylethylketone. This dispersion solution was applied onto the negative electrode obtained by the above method so that the stabilized lithium powder was applied by 0.5 mg/cm$^2$. This negative electrode was dried at 100° C. Then, a pressure of 10 kgf/cm$^2$ was applied by hand pressing, and accordingly the negative electrode is doped with lithium. Thus, the negative electrode doped with lithium was obtained. Here, the damage on the negative electrode was not observed.

(Fabrication of Lithium Ion Secondary Battery for Evaluation)

The negative electrode fabricated as above, a counter electrode where a lithium metal foil was attached to a copper foil as the positive electrode, and a separator formed of a polyethylene microporous film held between the negative electrode and the positive electrode were input into an aluminum laminated pack. Into the aluminum laminated pack, a $LiPF_6$ solution of 1 M (solvent: ethylene carbonate (EC)/diethyl carbonate (DEC)=3/7 (volume ratio)) was poured as the electrolyte solution. Then, the aluminum laminated pack was sealed to vacuum, thereby fabricating the lithium ion secondary battery for evaluation.

<Measurement of Average Feret Diameter and Average Circularity>

The stabilized lithium powder particles prepared as above were observed using an optical microscope. The obtained observation images were analyzed using the image analysis software (software name: ImageJ) to obtain the Feret diameter and circularity of the powder particle. At least 500 powder particles were subjected to the image analysis. The Feret diameter and circularity of the stabilized lithium powder were obtained. The Feret diameter is obtained as the length of the long side of the rectangle circumscribing the observation image. The circularity C is defined by $C=4\pi S/L^2$ where S represents the area of the particle image and L represents the circumference length of the particle image.

<Measurement of Initial Charging/Discharging Efficiency>

With the secondary battery charge/discharge system (manufactured by HOKUTO DENKO CORPORATION), the lithium ion secondary battery for evaluation fabricated as above was charged and discharged in a thermostatic chamber with a temperature of 25° C. under the following condition. The charging and discharging were conducted with a voltage ranging from 0.005 V to 2.5 V and at a current of 0.05 C (1 C=1600 mAh/g). Thus, the initial charging capacity and the initial discharging capacity were obtained. With these results, the initial charging/discharging efficiency was obtained. The initial charging/discharging efficiency (%) corresponds to the ratio of the initial discharging capacity relative to the initial charging capacity (100×initial discharging capacity/initial charging capacity). As this value is higher, the irreversible capacity is reduced. The high initial charging/discharging efficiency indicates that the excellent doping effect has been achieved. Table 1 shows the results of the obtained initial charging/discharging efficiency and the results of the average Feret diameter and the average circularity of the stabilized lithium powder.

Examples 2 to 14

Stabilized lithium powder according to Examples 2 to 14 was obtained in the same manner as that of Example 1, except that the stabilized lithium powder was fabricated under the condition as shown in Table 1. With the obtained stabilized lithium powder, lithium ion secondary batteries for evaluation according to Examples 2 to 14 were fabricated in the same manner as that of Example 1.

The lithium ion secondary batteries for evaluation according to Examples 2 to 14 were subjected to various tests conducted in Example 1. The results are shown in Table 1. The damage on the negative electrode was not observed in any of the samples in Examples 2 to 14, which is similar to the sample in Example 1. Moreover, the high initial charging/discharging efficiency was exhibited. The stabilized lithium powder exhibiting the further excellent doping performance was obtained by controlling the average circularity and the average Feret diameter.

Examples 15 to 17

Stabilized lithium powder according to Examples 15 to 17 was obtained under the same condition as that of Example 1, except that commercially-available Fe powder was added at a concentration shown in Table 2 at the same time as the supply of carbon dioxide. With the obtained stabilized lithium powder, lithium ion secondary batteries for evaluation according to Examples 15 to 17 were fabricated in the same manner as that of Example 1.

The lithium ion secondary batteries for evaluation according to Examples 15 to 17 were subjected to various tests conducted in Example 1. The results are shown in Table 2. In Examples 15 to 17, the initial charging/discharging efficiency is higher than that of Example 1. The stabilized lithium powder exhibiting the further excellent doping performance was obtained by controlling the amount of Fe.

Comparative Example 1

Figure 2:
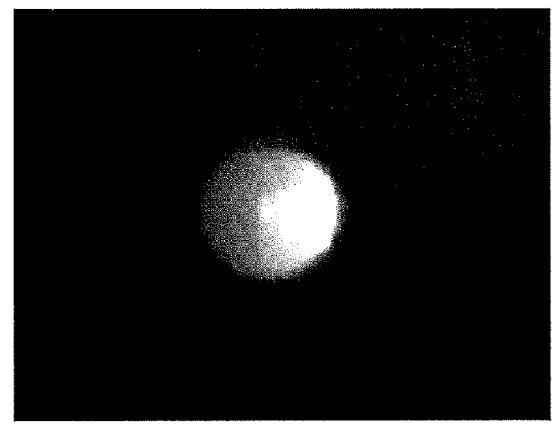
FIG. 2 is an optical microscope photograph of a conventional stabilized lithium powder particle for a lithium ion secondary battery.

With the use of the commercially-available stabilized lithium powder (product name. SLMP manufactured by FMC), a lithium ion secondary battery for evaluation according to Comparative Example 1 was fabricated in the same manner as that of Example 1. FIG. 2 is an optical microscope photograph of stabilized lithium powder particle according to Comparative Example 1. It can be confirmed that, from FIG. 2, the stabilized lithium powder particle is spherical.

Comparative Example 2

Stabilized lithium powder according to Comparative Example 2 was obtained under the same condition as that of Example 1, except that some of the fabrication condition was changed to that shown in Table 1. With the use of the obtained stabilized lithium powder, a lithium ion secondary battery for evaluation according to Comparative Example 2 was fabricated in the same manner as that of Example 1.

TABLE 1

|  | Rotation speed [rpm] | Vessel tilt angle [degree] | $CO_2$ supply [g] | Average circularity [—] | Average Feret diameter [—] | Li content [part by mass] | Initial charging/discharging efficiency [%] |
|---|---|---|---|---|---|---|---|
| Example 1 | 8000 | 5 | 5 | 0.90 | 18.3 | 89.2 | 93.1 |
| Example 2 | 7500 | 5 | 5 | 0.85 | 25.0 | 89.9 | 96.4 |
| Example 3 | 10000 | 5 | 5 | 0.80 | 15.4 | 87.6 | 95.2 |
| Example 4 | 6000 | 7 | 5 | 0.77 | 32.0 | 90.2 | 97.0 |
| Example 5 | 5000 | 7 | 5 | 0.74 | 40.0 | 89.3 | 96.0 |
| Example 6 | 10000 | 10 | 5 | 0.52 | 15.0 | 90.0 | 88.0 |
| Example 7 | 10000 | 15 | 5 | 0.13 | 14.7 | 88.1 | 93.2 |
| Example 8 | 7000 | 10 | 5 | 0.57 | 25.0 | 90.3 | 89.0 |
| Example 9 | 6500 | 10 | 5 | 0.56 | 26.4 | 89.0 | 89.8 |
| Example 10 | 4000 | 10 | 5 | 0.60 | 53.0 | 89.0 | 85.0 |
| Example 11 | 3000 | 10 | 5 | 0.63 | 62.3 | 89.0 | 84.3 |
| Example 12 | 10000 | 10 | 12 | 0.54 | 15.9 | 81.3 | 91.0 |
| Example 13 | 10000 | 10 | 15 | 0.55 | 16.2 | 77.4 | 87.1 |
| Example 14 | 8500 | 12 | 5 | 0.30 | 16.0 | 89.5 | 88.0 |
| Comparative Example 1 | — | — | — | 0.97 | 20.1 | 90.1 | 67.0 |
| Comparative Example 2 | 8000 | 0 | 5 | 0.95 | 24.5 | 88.6 | 69.0 |

TABLE 2

|  | Fe content [$10^{-3}$ mass %] | Initial charging/discharging efficiency [%] |
|---|---|---|
| Example 1 | 0.0 | 93.1 |
| Example 15 | 1.0 | 95.0 |
| Example 16 | 2.0 | 96.1 |
| Example 17 | 9.7 | 96.0 |

The stabilized lithium powder according to the present disclosure enables the improvement of the doping efficiency. By the use of the electrode obtained by the above method, the lithium ion secondary battery with the improved initial charging/discharging efficiency can be provided.

The stabilized lithium powder for a lithium ion secondary battery according to the embodiment of the present disclosure may be any of the following first to third stabilized lithium powder for a lithium ion secondary battery.

The first stabilized lithium powder for a lithium ion secondary battery satisfies a relation of $C \leq 0.90$, where C represents the average circularity of particles.

The second stabilized lithium powder for a lithium ion secondary battery is the first stabilized lithium powder for a lithium ion secondary battery, which satisfies a relation of $FD \leq 53.0$ μm, where FD represents the average Feret diameter of the particles.

The third stabilized lithium powder for a lithium ion secondary battery is the first or second stabilized lithium powder for a lithium ion secondary battery, wherein the particles include transition metal by $1.0 \times 10^{-3}$ mass % or more and $1.0 \times 10^{-1}$ mass % or less.

The lithium ion secondary battery according to the embodiment of the present disclosure may be a lithium ion secondary battery including a negative electrode doped with lithium from any of the first to third stabilized lithium powder, a positive electrode, and an electrolyte.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. Stabilized lithium powder, comprising powder particles satisfying a relation of $C \leq 0.90$, where C represents average circularity of the powder particles, wherein C is defined by $C = 4\pi S/L^2$, where S represents an area of a particle image and L represents a circumference length of the particle.

2. The stabilized lithium powder according to claim 1, wherein the powder particles satisfy a relation of $FD \leq 53.0$ μm, where FD represents average Feret diameter of the powder particles.

3. The stabilized lithium powder according to claim 1, comprising transition metal by $1.0 \times 10^{-3}$ mass % or more and $1.0 \times 10^{-1}$ mass % or less.

4. The stabilized lithium powder according to claim 2, comprising transition metal by $1.0 \times 10^{-3}$ mass % or more and $1.0 \times 10^{-1}$ mass % or less.

5. A lithium ion secondary battery comprising:
   a negative electrode doped with lithium from the stabilized lithium powder according to claim 1;
   a positive electrode; and
   an electrolyte.

6. A lithium ion secondary battery comprising:
   a negative electrode doped with lithium from the stabilized lithium powder according to claim 2;
   a positive electrode; and
   an electrolyte.

7. A lithium ion secondary battery comprising:
   a negative electrode doped with lithium from the stabilized lithium powder according to claim 3;
   a positive electrode; and
   an electrolyte.

8. The stabilized lithium powder according to claim 1, comprising transition metal by $1.0 \times 10^{-3}$ mass % or more and $10.0 \times 10^{-3}$ mass % or less.

9. The stabilized lithium powder according to claim 3, wherein the transition metal is selected from the group consisting of Mg, Al, Ti, Zr, Mn, Zn, Cr, Fe, Ni and Sn and Cu.

10. The stabilized lithium powder according to claim 9, wherein the transition metal is Fe.

11. Stabilized lithium powder, comprising powder particles satisfying a relation of $C \leq 0.90$, where C represents average circularity of the powder particles, wherein C is defined by $C = 4\pi S/L^2$, where S represents an area of a particle image and L represents a circumference length of the particle; and Fe by $1.0 \times 10^{-3}$ mass % or more and $10.0 \times 10^{-3}$ mass % or less.

* * * * *